United States Patent
Sarhan et al.

(10) Patent No.: US 7,804,846 B2
(45) Date of Patent: Sep. 28, 2010

(54) ROBUST DEFRAMING OF MAC LAYER PACKETS FOR MOBILE MULTIMEDIA MULTICAST SYSTEM

(75) Inventors: Samer Sarhan, Cairo (EG); Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 268 days.

(21) Appl. No.: 12/124,387

(22) Filed: May 21, 2008

(65) Prior Publication Data

US 2009/0290496 A1    Nov. 26, 2009

(51) Int. Cl.
*H04J 3/00* (2006.01)
(52) U.S. Cl. ..................................... 370/464
(58) Field of Classification Search ............... None
See application file for complete search history.

(56) References Cited

U.S. PATENT DOCUMENTS

| | | | |
|---|---|---|---|
| 7,370,113 B2* | 5/2008 | Tamura | 709/230 |
| 7,492,789 B2* | 2/2009 | Shvodian | 370/469 |
| 2003/0103521 A1* | 6/2003 | Raphaeli et al. | 370/445 |
| 2003/0165160 A1* | 9/2003 | Minami et al. | 370/466 |
| 2004/0170182 A1* | 9/2004 | Higashida et al. | 370/401 |
| 2006/0153232 A1* | 7/2006 | Shvodian | 370/468 |
| 2007/0253430 A1* | 11/2007 | Minami et al. | 370/395.52 |
| 2009/0290496 A1* | 11/2009 | Sarhan et al. | 370/242 |

* cited by examiner

*Primary Examiner*—Chi H Pham
*Assistant Examiner*—Fan Ng
(74) *Attorney, Agent, or Firm*—Rahman LLC

(57) ABSTRACT

Finding errors in the fragment headers of the fragments of service layer packets without depending on the erasure indicators of Medium Access Channel (MAC) layer packets of a wireless signal in a wireless communication system includes determining if length of the fragment header is between 121 and 127; determining if length of the fragment header is equal to 127, and if the fragment header is not the last fragment header in a service layer packet being formed; determining if summation of length of the fragment header for a value N is greater than 122 subtracted by number of fragments collected from a MAC layer packet including fragment header; and determining if fragment header is not the last fragment header in the service layer packet being formed, and if fragment header length is less than residual number of bytes in the MAC layer packet.

20 Claims, 6 Drawing Sheets

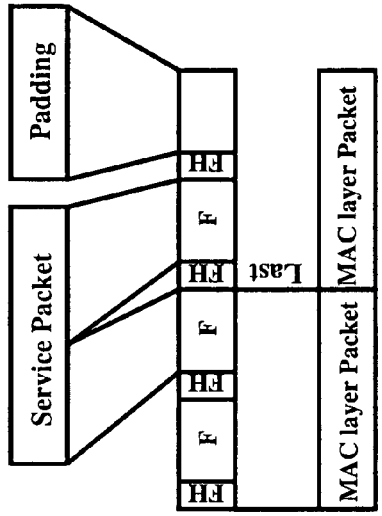
FIG. 5
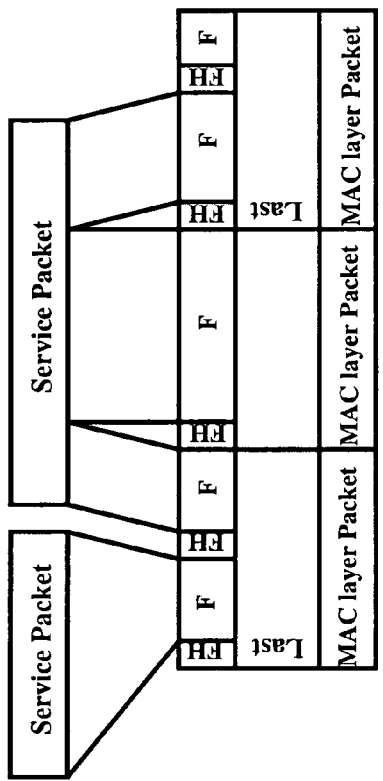
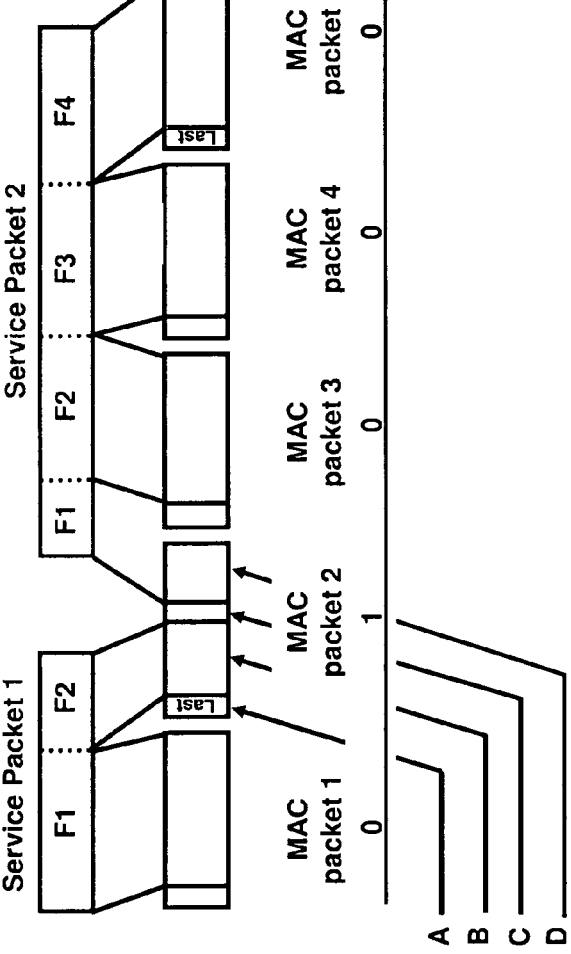
FIG. 6

ROBUST DEFRAMING OF MAC LAYER PACKETS FOR MOBILE MULTIMEDIA MULTICAST SYSTEM

BACKGROUND

1. Technical Field

The embodiments herein generally relate to digital communication networks based on a MediaFLO™ (Forward Link Only) mobile multimedia multicast system, and more particularly, a method to find errors in MediaFLO™ system service layer packet fragments without erasure indicators of Medium Access Channel (MAC) layer packets.

2. Description of the Related Art

In recent years, the wireless industry has seen explosive growth in device capability, especially in relation to mobile devices, such as cell phones, handhelds, gaming consoles, etc. Ever-increasing demand for computing power, memory, and high-end graphic functionalities has accelerated the development of new and exciting wireless services. In the last few years, multiple technologies have been proposed to address delivery of streaming multimedia to mobile devices.

Multimedia communications provide a rich and immediate environment of image, graphics, sound, text and interaction through a range of technologies. An example of multimedia communication is streaming multimedia which is primarily a delivery of continuous synchronized media data. The streaming multimedia is constantly received by, and displayed to an end user while it is being delivered by a provider. Multiple technologies such as Integrated Services Digital Broadcasting-Terrestrial (ISDB-T), Terrestrial-Digital Multimedia Broadcasting (T-DMB), Satellite-Digital Multimedia Broadcasting (S-DMB), Digital Video Broadcasting-Handheld (DVB-H), and FLO (Forward Link Only) are used to address the delivery of streaming multimedia to mobile devices. These technologies have typically leveraged upon either third generation cellular/PCS, or digital terrestrial TV broadcast technologies.

For delivering unprecedented volumes of high-quality, streaming or clipped, audio and video multimedia to wireless subscribers, an air interface has been developed based on FLO technology for MediaFLO™ mobile multimedia multicast system available from Qualcomm, Inc., California, USA. MediaFLO™ or media forward link only is a combination of the media distribution system and the FLO technology. The FLO technology is the ability to deliver a rich variety of content choice to consumers while efficiently utilizing spectrum as well as effectively managing capital and operating expenses for service providers. The details of the MediaFLO™ mobile multimedia multicast system are available in Chari, M. et al., "FLO Physical Layer: An Overview," IEEE Transactions on Broadcasting, Vol. 53, No. 1, March 2007, the contents of which, in its entirety, is herein incorporated by reference.

FLO technology was designed specifically for the efficient and economical distribution of the same multimedia content to millions of wireless subscribers simultaneously. Also, the FLO technology was designed from the ground up to be a multicasting network, which is overlaid upon a cellular network. It does not need to support any backward compatibility constraints. Thus, both the network infrastructure and the receiver devices are separate from those for the cellular/PCS network. Moreover, as the name suggests, the technology relies on the use of a forward link (network to device) only.

FLO enables reducing the cost of delivering such content and enhancing the user experience, allowing consumers to "surf" channels of content on the same mobile handsets they use for traditional cellular voice and data services.

MediaFLO™ technology can provide robust mobile performance and high capacity without compromising power consumption. The technology also reduces the network cost of delivering multimedia content by dramatically decreasing the number of transmitters needed to be deployed. In addition, MediaFLO™ technology-based multimedia multicasting complements wireless operators' cellular network data and voice services, delivering content to the same cellular handsets used on 3G networks.

The MediaFLO™ wireless system has been designed to broadcast real time audio and video signals, apart from non-real time services to mobile users. The system complements existing networks and radically expands the ability to deliver desired content without impacting the voice and data services. Operators can leverage the MediaFLO™ system to increase average revenue per user (ARPU) and reduce churn by offering enhanced multimedia services. Content providers can take advantage of a new distribution channel to extend their brand to mobile users. Device manufacturers will benefit from increased demand for multimedia-enabled handsets as consumer appetite grows for the rich content provided through MediaFLO™ systems.

The MediaFLO™ service is designed to provide the user with a viewing experience similar to a television viewing experience by providing a familiar type of program-guide user interface. Users can simply select a presentation package, or grouping of programs, just as they would select a channel to subscribe to on television. Once the programs are selected and subscribed to, the user can view the available programming content at any time. In addition to viewing high quality video and audio content and IP data, the user may also have access to related interactive services, including the option to purchase a music album, ring tone, or download of a song featured in a music program. The user can also purchase access to on-demand video programming, above and beyond the content featured on the program guide.

The respective MediaFLO™ system transmission is carried out using tall and high power transmitters to ensure wide coverage in a given geographical area. Further, it is common to deploy 3-4 transmitters in most markets to ensure that the MediaFLO™ system signal reaches a significant portion of the population in a given market. During the acquisition process of a MediaFLO™ system data packet several determinations and computations are made to determine such aspects as frequency offsets for the respective wireless receiver. Given the nature of MediaFLO™ system broadcasts that support multimedia data acquisitions, efficient processing of such data and associated overhead information is paramount. For instance, when determining frequency offsets or other parameters, complex processing and determinations are required where determinations of phase and associated angles are employed to facilitate the MediaFLO™ system transmission and reception of data.

To achieve good receiver performance and high spectral efficiency of multimedia multicasting in a mobile communication environment, the FLO physical layer uses Orthogonal Frequency Division Multiplexing (OFDM) as the modulation technique. Inside an OFDM symbol, a Wide-area Identification Channel (WIC) spans one OFDM symbol and is transmitted at OFDM symbol index 1 in a superframe. It follows the Time Division Multiplexing (TDM) Pilot 1 OFDM symbol. This is an overhead channel that is used for conveying the Wide-area Differentiator (WID) to the FLO receivers. The Local-area Identification Channel (LIC) spans one OFDM symbol and is transmitted at OFDM symbol index 2 in a superframe. It follows the WIC channel OFDM symbol. This is an overhead channel that is used for conveying the Local-area Differentiator (LID) information to the FLO receivers.

The values of WID and LID constitute a part of the scrambling sequence that is used for the scrambling of both the wide and local area Overhead Information Symbols (OIS) and the data fields. Without the values of the WID and the LID, it is not possible to descramble neither the OIS nor the data fields.

A channel model is the model that describes the phenomena that affects the transmitted information along its path to the receiver. These phenomena may change transmitted frames completely. In order to avoid incorrect reception there is an equalizing stage at the receiver that creates a model for the channel and equalizes its effect. The received data sequence can be represented by the equation $r(t)=h(t) \cdot x(t)$, where $r(t)$ is the received data sequence, $h(t)$ is the channel effect, and $x(t)$ is the descrambled transmitted data sequence. The equalizer's role is to estimate the channel effect $h(t)$ continuously in order to get the actual descrambled transmitted data sequence $x(t)$. For this purpose FDM pilots are needed.

The FDM pilot symbols are descrambled and sent within the OIS and data frames symbols inside a superframe. To find the values of FDM symbols, it is necessary to get the values of WID and LID which get distorted by the channel effects. The WIC and LIC symbols do not contain FDM Pilots so a channel model cannot be constructed for these symbols.

SUMMARY

In view of the foregoing, an embodiment herein provides a method for finding errors in the fragment headers of the fragments of service layer packets without depending on the erasure indicators of MAC layer packets of a wireless signal in a wireless communication system, and a program storage device, readable by a computer, tangibly embodying a program of instructions executable by the computer to perform the method for finding errors in the fragment headers of the fragments of service layer packets without depending on the erasure indicators of MAC layer packets of a wireless signal in a wireless communication system, wherein the method comprises determining if a length of the fragment header is less than 127 and greater than 121; determining if the length of the fragment header is equal to 127, and if fragment header is not a last fragment header in a service layer packet being formed; determining if a summation of length of the fragment header for a value N is greater than 122 subtracted by N, wherein N is the number of fragments collected from a MAC layer packet including the fragment header; and determining if the fragment header is not the last fragment header in the service layer packet being formed, and if the length of the fragment header is less than a residual number of bytes in the MAC layer packet.

The method may further comprise deframing the MAC layer packet by reading data units in fragments of the MAC layer packet. Moreover, deframing of the MAC layer packet is conducted by deframing a sublayer of a transport layer of the MAC layer packet to form service layer packets. Preferably, the MAC layer packet comprises a block of 122 bytes. The method may further comprise determining errors in fragment headers of the MAC layer packet without respective help by depending on a value of an erasure indicator associated with each MAC layer packet. Preferably, detecting errors in the fragment header without depending on a value of an erasure indicator further comprises determining a current fragment length; determining a residual number of bytes in a current MAC layer packet; determining the number of fragments in the current MAC layer packet; and determining if a current fragment header is the last fragment of the service layer packet. Preferably, the current fragment header is set invalid if the current fragment is not a last fragment of the service layer packet of length smaller than the residual number of bytes in the current MAC layer packet or a current fragment length is equal to 127 and is not the last fragment of the service layer packet or a value of a current fragment length is smaller than 127 and greater than 121 or a value of the summation of collected fragments length in the current MAC layer packet is greater than the difference of 122 and number of fragments collected from the current MAC layer packet. The method may further comprise applying a deframing algorithm to fragments of the MAC layer packet by concatenating fragments of a current service layer packet; raising an error flag for a currently concatenated service layer packet; jumping to the first byte in the fragment header in the next MAC layer packet; concatenating the fragments to a current service layer packet until a last fragment of a current packet; discarding a current service layer packet; and continuing deframing of remaining packets.

Another embodiment includes a system for finding errors in the fragment headers of the fragments of service layer packets without depending on the erasure indicators of the MAC layer packets, the system comprising means for determining if length of the fragment header is less than 127 and greater than 121; means for determining if the length of the fragment header is equal to 127, and if the fragment header is not the last fragment header in a service layer packet being formed; means for determining if summation of the length of the fragment header for a value N is greater than 122 subtracted by N, where N is the number of fragments collected from a MAC layer packet including the fragment header; and means for determining if the fragment header is not the last fragment header in the service layer packet being formed, and if the length of the fragment header is less than a residual number of bytes in the MAC layer packet.

The system may further comprise means for deframing the MAC layer packet by reading data units in fragments of the MAC layer packet, wherein deframing of the MAC layer packet is conducted by deframing a sublayer of a transport layer of the MAC layer packet to form the service layer packets. Preferably, the MAC layer packet comprises a block of 122 bytes. The system may further comprise means for determining errors in fragment headers of the MAC layer packet without help by depending on a value of an erasure indicator associated with each the MAC layer packet, wherein the detecting errors in the fragment header without depending on a value of an erasure indicator further comprises determining a current fragment length; determining a residual number of bytes in a current MAC layer packet; determining the number of fragments in the current MAC layer packet; and determining if a current fragment header is the last fragment of the current service layer packet.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5 illustrates a framing process according to an embodiment herein;

FIG. 6 is an example of the effect of using the embodiments herein on the deframing criteria;

DETAILED DESCRIPTION OF PREFERRED EMBODIMENTS

Figure 1:
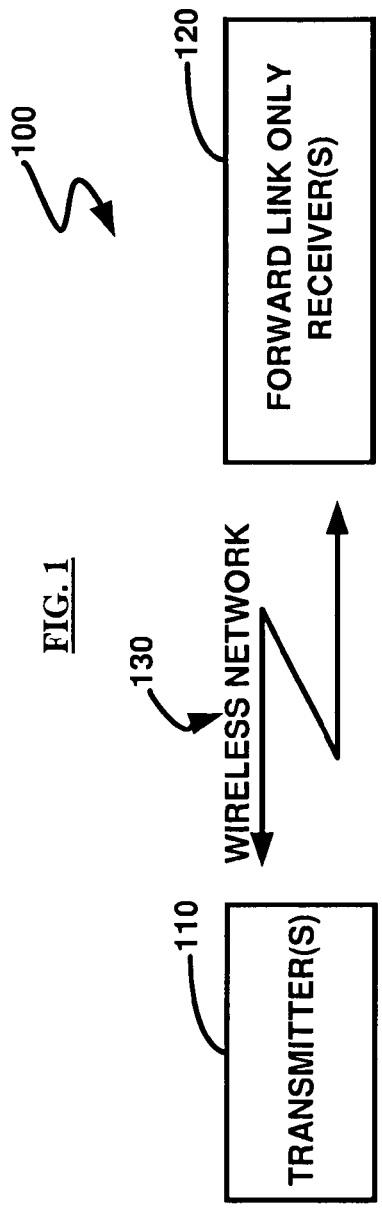
FIG. 1 illustrates a FLO system for a MediaFLO™ system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a method for examining the correctness of fragment headers and recovering from the errors in fragment headers during the deframing process in the transport layer which results in robust deframing of MediaFLO™ system packets. Referring now to the drawings, and more particularly to FIGS. 1 through 8, where similar reference characters denote corresponding features consistently throughout the figures, there are shown preferred embodiments.

The FLO system is comprised of two parts: (a) The FLO network, which includes the collection of transmitters and the backhaul network, and (b) The FLO device, which may be any type of communicating devices such as a cell phone, computer, personal assistant, laptop, handheld, or gaming consoles, etc. FIG. 1 illustrates a FLO system 100 for a MediaFLO™ system. The system 100 includes one or more transmitters 110 that communicate across a wireless network 130 to one or more receivers 120.

The FLO system 100 is utilized in developing an air interface for the MediaFLO™ mobile multicast system. The air interface uses Orthogonal Frequency Division Multiplexing (OFDM) as the modulation technique, which is also utilized by Digital Audio Broadcasting (DAB), (DVD-T), and (ISDB-T).

To ensure that the user experience is as uniform as possible over the entire coverage area and optimize spectral efficiency and network economics, FLO system 100 employs the concept of Single Frequency Network (SFN) operation.

The FLO system 100 multicasts several services. A service is an aggregation of one or more related data components, such as the video, audio, text or signaling associated with a service. In an embodiment, the services are classified into two types based on their coverage area: Wide-area services and Local-area services. A Local-area service is multicast for reception within a metropolitan area. By contrast, Wide-area services are multicast in one or more metropolitan areas. The term Local-area is used to denote the transmitters within a metropolitan area. The term Wide-area is used to denote transmitters in one or more metropolitan areas that multicast the same Wide-area services. Thus, a Wide-area contains one or more Local-areas, with the transmitters in the different Local-areas multicasting different local area services and in an embodiment, using different radio frequency (RF) center frequencies.

FLO services are carried over one or more logical channels. These logical channels are called Multicast Logical Channels (MLC). An important aspect is that MLCs are distinguishable at the physical layer. For example, the video and audio components of a given service can be sent on two different MLCs. A FLO device (a receiver from the plurality of receivers 120) that is interested in the audio component can only receive the corresponding MLC without receiving the MLC for the video component, thereby saving battery resources.

The statistical multiplexing of different services, or MLCs, is achieved by varying only the MLC time and frequency allocations over prescribed time intervals to match the variability in the MLC's source rates. Statistical multiplexing in FLO enables the receivers 120 to demodulate and decode only the MLC(s) of interest.

The data rates required by the services are expected to vary over a wide range, depending on their multimedia content. Thus, effective use of statistical multiplexing can significantly increase the number of services supported by a multicast system using a specified channel bandwidth.

Figure 2:
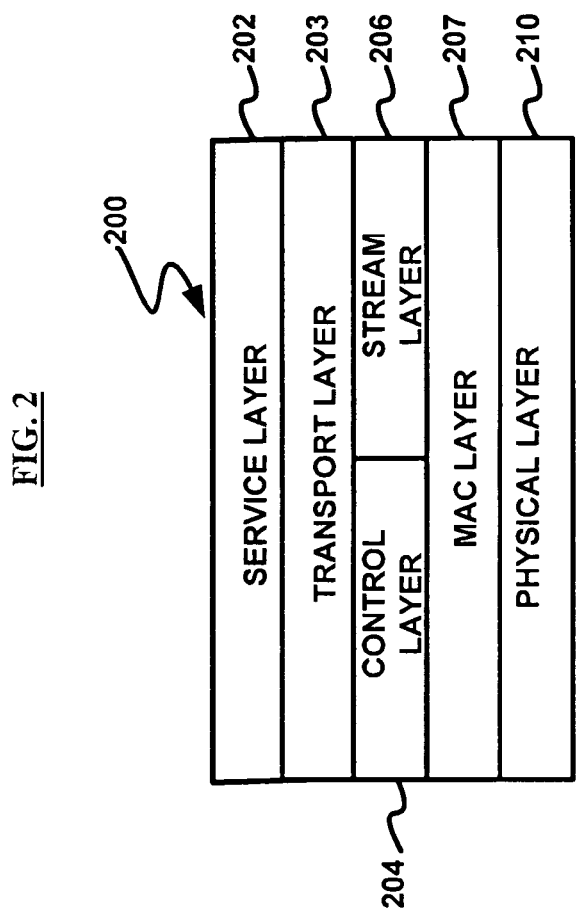
FIG. 2 illustrates a layering architecture for an air interface of a FLO system according to an embodiment herein.

FIG. 2 illustrates a layering architecture 200 for an air interface of a FLO system. The air interface is layered with the interface defined for each layer. The layers are as follows:

The service layer 202 provides multiple functions and applications including compression of multimedia content, access control to multimedia. The transport layer 203 provides fragmenting application service packets and concatenating the fragments into fixed size stream layer blocks. The MAC layer 207 controls access to the physical layer 210, performs the mapping between logical channels and physical channels, multiplexes logical channels for transmission over the physical channel, de-multiplexes the logical channels at the mobile device, and enforces Quality of service (QOS) requirements.

The control layer 204 provides binding of application services to streams of each logical channel. The stream layer 206 provides packetization residual error handling functions and delivery of stream layer blocks to the MAC layer 207. Each stream block corresponds to a MAC layer packet of (122) octets. The physical layer 210 provides channel structure for the forward link and defines frequency, modulation, and encoding requirements.

At each transmitter 110 (of FIG. 1), the transmitted MLCs of the FLO system 100 (of FIG. 1) are organized as superframes. In an embodiment, a superframe is of one-second duration and comprises 1200 OFDM symbols of 0.833 ms duration each. In an embodiment, each superframe comprises 200 OFDM symbols per MHz of allocated bandwidth, as each of the OFDM symbol is of 0.833 ms duration.

Figure 3:
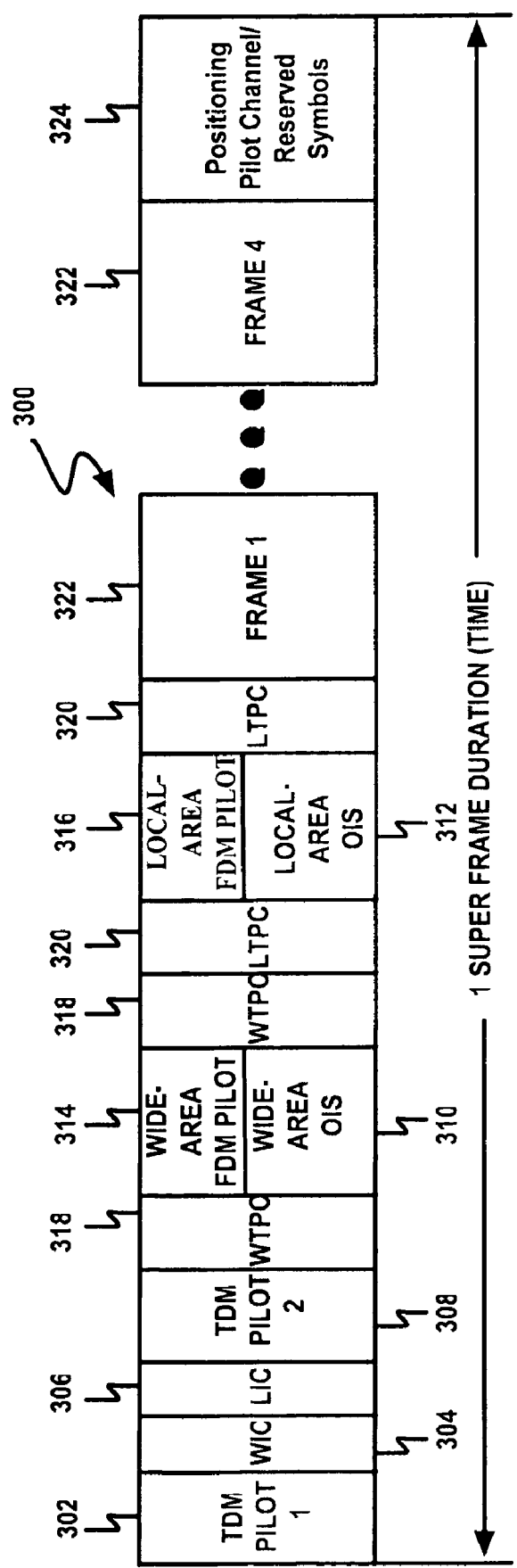
FIG. 3 illustrates a FLO superframe structure for a Media-FLO™ system according to an embodiment herein.

FIG. 3 illustrates a FLO superframe structure 300 for a MediaFLO™ system. The transmission and reception in the FLO system are based on using 4096 (4K) subcarriers. The selection of 4096 subcarriers in FLO provides superior mobile performance compared to 2048 (2K) and 8192 (8K) subcarriers. Of the 4096 subcarriers, 96 are unused and referred to as guard subcarriers. The remaining 4000 subcarriers are referred to as active subcarriers, which are modulated by data or pilot symbols. In an embodiment, these 4000 active subcarriers are further equally divided into eight disjoint groups called interlaces. One interlace from the group is assigned to the Frequency Division Multiplexing (FDM) pilot and is used for channel estimation. The remaining seven interlaces are available for modulation with data symbols. The pilot and data subcarriers are modulated with symbols that have the same energy in the FLO system. These interlaces are allocated to MLC(s) and enable frequency-division multiplexing. Since, the subcarriers within an interlace span the total FLO signal bandwidth there is no loss of frequency diversity.

Forward error correction and coding can also be used to gain the benefit of OFDM over time/frequency-selective channels. In an embodiment, the FLO design uses a concatenated coding scheme, comprising of an outer Reed Solomon (RS) code and an inner Parallel Concatenated Convolution code (PCCC), also called as a turbo code.

As illustrated in FIG. 3, a superframe is divided into Time Division Multiplexed (TDM) pilot OFDM symbols, frequency division multiplexed (FDM) pilot channel with Overhead Information symbols (OIS) channel, Transition Pilot Channels (TPC) symbols 318, 320, data channels 322, and Positioning Pilot Channel (PPC) 324.

There are four TDM pilot OFDM symbols namely TDM pilot 1 (TDM1) 302, Wide-area Identification Channel (WIC) 304, Local-area Identification Channel (LIC) 306, and TDM pilot 2 (TDM2) 308.

The OIS channel is divided into two sections namely the Wide-area OIS channel 310, and Local-area OIS channel 312, each comprising five OFDM symbols that carry overhead information. The Wide-area OIS channel 310 contains information about those MLCs that are common to the wide area, while the Local-area OIS channel 312 contains information about those MLCs that are common to specific local coverage areas.

Similar to the OIS channel, a FDM pilot channel is divided into two sections namely the Wide-area FDM pilot channel 314 and the Local-area FDM pilot channel 316. The TPCs 318, 320 are symbols flanking each continuous portion of the Local-area OIS 312, Wide-area OIS 310, Local-area data frames and Wide-area data frames. The TPC symbols 318, 320 are used to assist channel estimation for demodulation of the data OFDM symbol adjacent to them.

The four data channels 322 occupy a substantial portion of the superframe 300 and carry the multicast multimedia information to the FLO receivers 120 of FIG. 1. The PPC 324 forms the last portion of a superframe 300 and comprises 2, 6, 10, or 14 OFDM symbols. The PPC symbol 324 is unique for each transmitter 110 of FIG. 1 and in an embodiment, is used for transmitter identification. In an embodiment the PPC 324 is used for position location of the receiving device using triangulation methods.

In MediaFLO™ mobile TV systems, TV service content is transmitted every second. The content of one second is called a superframe. The superframe contents are carried by one or more flows. A flow can carry service layer packets. For each flow, a configuration option can be used to send 16-bit Cyclic Redundancy Check (CRC) after each service layer packets.

The MAC layer packets are transformed into service layer packets by transport layer in the network.

Figure 4:
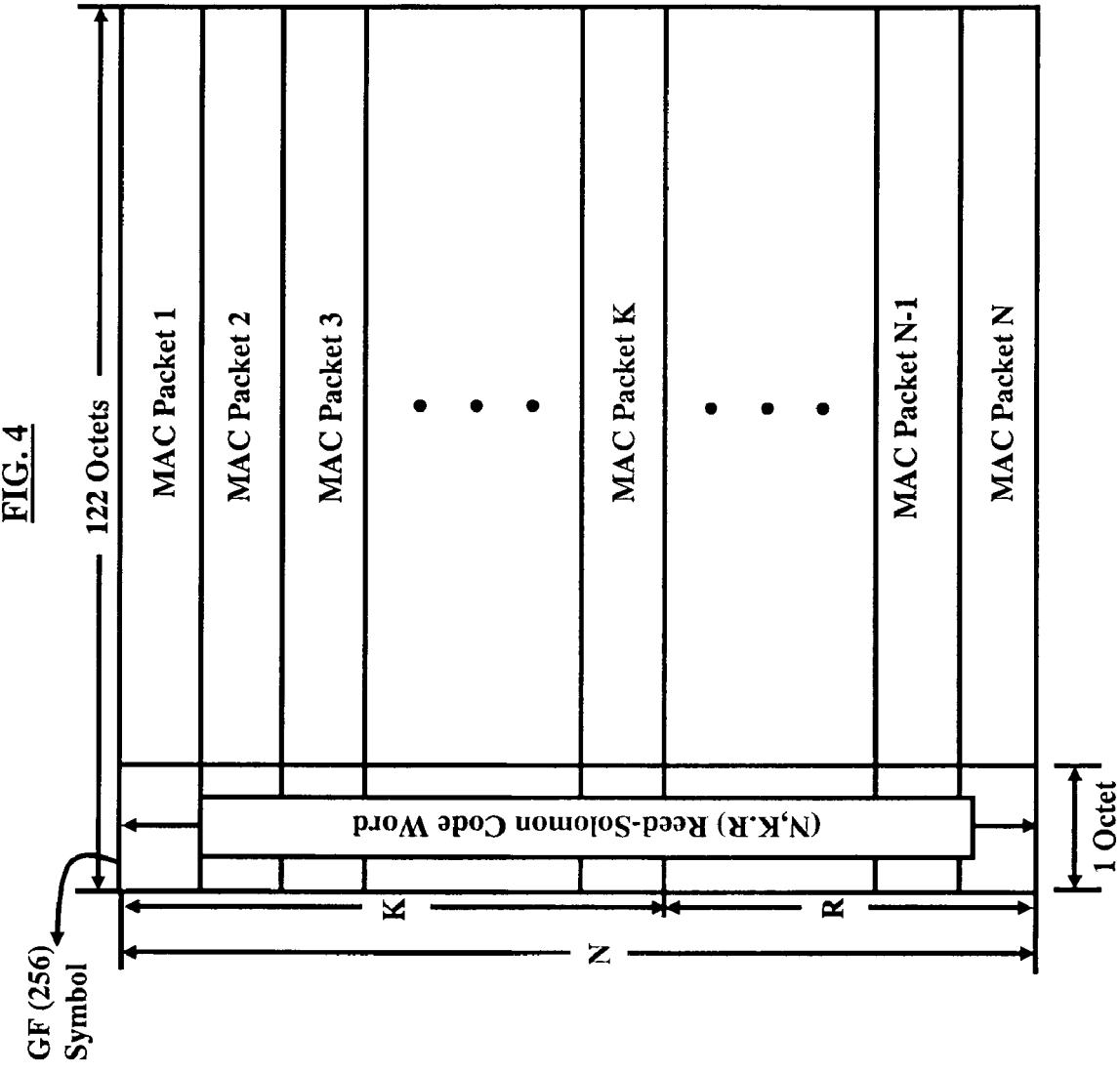
FIG. 4 illustrates structure of Reed-Solomon error-control block according to an embodiment herein.

A Reed-Solomon (RS) encoding process is shown in FIG. 4, in which a MAC layer packet is a block of 122 octets (bytes). Parity bytes are added to MAC layer packets using Reed-Solomon encoding. An error control block is formed of N rows and 122 octet columns. The top K rows of the error control block each contain a single MAC layer packet. The bottom R=N−K rows of the error control block contain Reed-Solomon parity octets.

In MediaFLO™ receivers, the physical layer 210 provides an error indicator per MAC layer packet, which is called erasure indicator. An erasure indicator is set if there are one or more bytes contain errors in its corresponding MAC layer packet. In MAC layer, RS decoding can successfully correct up to R MAC layer packet errors with no uncertainty, where all erasure indicators are cleared. If more than R MAC layer packets contain errors, the RS decoding cannot correct all errors. This cause uncertainty about providing erasure indicators to upper layer to indicate erroneous MAC layer packets. This provides possibility of displaying correct MAC layer packets erroneous.

In the transport layer 203, the deframing sublayer is sensitive to MAC layer packet errors. The deframing process reads units of data called "fragments" from the MAC layer packets. Each fragment body is preceded by a 1-byte header that contains the fragment length and a flag that is true if this fragment is the last fragment in the currently being formed service layer packet.

Fragments are concatenated one after another until a fragment with the last fragment flag set is found to form a service layer packet. The end of the deframing process is indicated by a fragment header with length=127 and last bit is set. Errors in fragment headers cause the deframing process to fail because the next fragment header location is known from the fragment lengths of all the previous fragments inside the current MAC layer packet. For error free deframing, all MAC layer packets with erasure indicator set shall be discarded to avoid any fragment header containing error in the MAC layer packet with the erasure indicator set. However, it is not an optimum decision to discard the these MAC layer packets because (1) if errors are in fragment bodies and are not in fragment headers then the deframing process can succeed and the error can be discovered easily if the CRC option is used and may be tolerated by upper layer entities like video decoders, (2) if an erroneous MAC layer packet is discarded, some correct fragments inside this MAC layer packet shall be discarded too, which is inefficient, (3) in addition, due to the uncertainty in the erasure indicator values, some correct MAC layer packets may be discarded.

Accordingly, the embodiments herein provide an efficient method to detect errors in fragment headers, which does not depend on the values of erasure indicators of MAC layer packets and can extract correct fragments from erroneous MAC layer packets without causing defaming process to fail. The embodiments herein achieve this as follows. Using the properties of the framing entity, the first byte of each MAC layer packet is a fragment header (FH), as illustrated in FIG. 5. The embodiments herein provide a technique for determining the correctness of the fragment header value without the need for an error indicator. A fragment header is determined invalid if any of the following is true:

1. 127>fragment length>121.
2. fragment length=127 and this is not the last fragment.

3.

$$\sum_N \text{fragment length} > (122 - N),$$

where N=number of fragments collected from the MAC layer packet including the current fragment.

4. If this is not the last fragment and fragment length<(the residual number of bytes in the current MAC layer packet).

If an invalid fragment header is found, the deframing technique provided by the embodiments herein:

1. Raises an error flag for this currently concatenated service layer packet.

2. Jump to the first byte in the fragment header in the next MAC layer packet.

3. Concatenate fragments to the current service layer packet applying the above rules until a fragment with the last bit set is found.

4. Discard the current service layer packet and continue deframing.

FIG. 6 shows and example of the effectiveness of the methodology provided by the embodiments herein. There are two service layer packets fragmented on five MAC layer packets. The notation Fn::Sm is used to refer to the fragment 'n' of service layer packet 'm'. The values of the erasure indicators show that MAC layer packet 2 contains an error. If the MAC layer packet 2 is discarded, then the deframer (not shown) shall discard F2::S2 and F1::S2. The deframing process can continue on MAC layer packets 3 to 5. All service layer packets fragments collected shall be discarded because some fragments have been discarded in both service layer packet 1 and 2 and the whole throughput is 0 service packets.

The throughput can be enhanced by inspecting the effect of the location of the error in the MAC layer packet 2 without discarding the packet. This is performed by applying the robust deframing criteria mentioned above to examine the correctness of fragment headers. (1) If there is an error at position (A) (fragment header of F2::S1) then the length of the fragment is not correct and the next known error free fragment header is located in MAC layer packet 3. This produces the same throughput as discarding the erroneous MAC layer packet. (2) If there is an error at position (C) (fragment header of F1::S2) then F2:S1 is not affected. The result is that service packet 1 is deframed successfully and service packet 2 is discarded and the throughput is 1 service packet. If there are errors in positions (B) or (D) (error in data not in fragment headers) then these errors do not affect the deframing process and the throughput is 2 service packets. The deframer (not shown) can discover the service packets (service packet 1, 2 or both) containing error if the CRC option is used. It is the responsibility of upper layers to discard or use the service packet containing errors.

Figure 7:
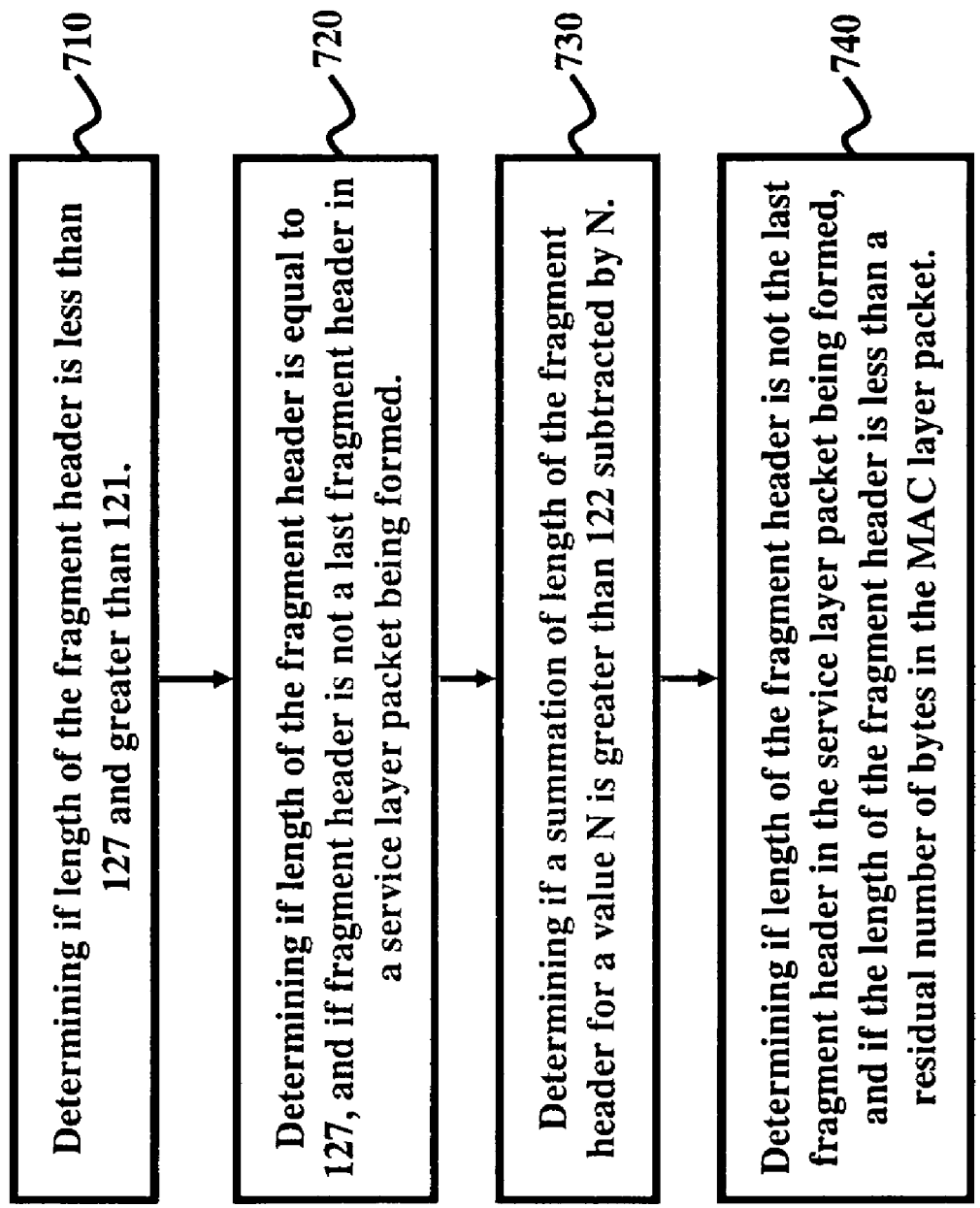
FIG. 7 is a flow diagram illustrating a preferred method according to an embodiment herein.

FIG. 7, with reference to FIGS. 1 through 6, illustrates a flow diagram of a method for finding errors in the fragment headers of the fragments of service layer packets without depending on the erasure indicators of MAC layer packets according to an embodiment herein. The method comprises determining (710) if a length of the fragment header is less than 127 and greater than 121; determining (720) if the length of the fragment header is equal to 127, and if fragment header is not a last fragment header in a service layer packet being formed; determining (730) if a summation of length of the fragment header for a value N is greater than 122 subtracted by N, where N is the number of fragments collected from a MAC layer 207 packet including the fragment header; and determining (740) if the fragment header is not the last fragment header in the service layer packet being formed, and if the length of the fragment header is less than a residual number of bytes in the MAC layer packet.

The method may further comprise deframing the MAC layer 207 packet by reading data units in fragments of the MAC layer packet. Moreover, deframing of the MAC layer 207 packet is conducted by deframing a sublayer of a transport layer 203 of the MAC layer 207 packet to form service layer 202 packets. Preferably, the MAC layer 207 packet comprises a block of 122 bytes. The method may further comprise determining errors in fragment headers of the MAC layer 207 packet without respective help by depending on a value of an erasure indicator associated with each MAC layer 207 packet. Preferably, detecting errors in the fragment header without depending on a value of an erasure indicator further comprises determining current fragment length; determining residual number of bytes in the current MAC layer 207 packet; determining the number of fragments in the current MAC layer 207 packet; and determining if a current fragment header is the last fragment of the service layer 202 packet. Preferably, the current fragment header is set invalid if the current fragment is not a last fragment of the service layer 202 packet of length smaller than the residual number of bytes in the current MAC layer 207 packet or a current fragment length is equal to 127 and is not the last fragment of the service layer 202 packet or a value of a current fragment length is smaller than 127 and greater than 121 or a value of the summation of collected fragments length in the current MAC layer 207 packet is greater than the difference of 122 and number of fragments collected from the current MAC layer 207 packet. The method may further comprise applying a deframing algorithm to fragments of the MAC layer 207 packet by concatenating fragments of a current service layer 202 packet; raising an error flag for a currently concatenated service layer 202 packet; jumping to the first byte in the fragment header in the next MAC layer 207 packet; concatenating the fragments to a current service layer 202 packet until a last fragment of a current packet; discarding a current service layer 202 packet; and continuing deframing of remaining packets.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
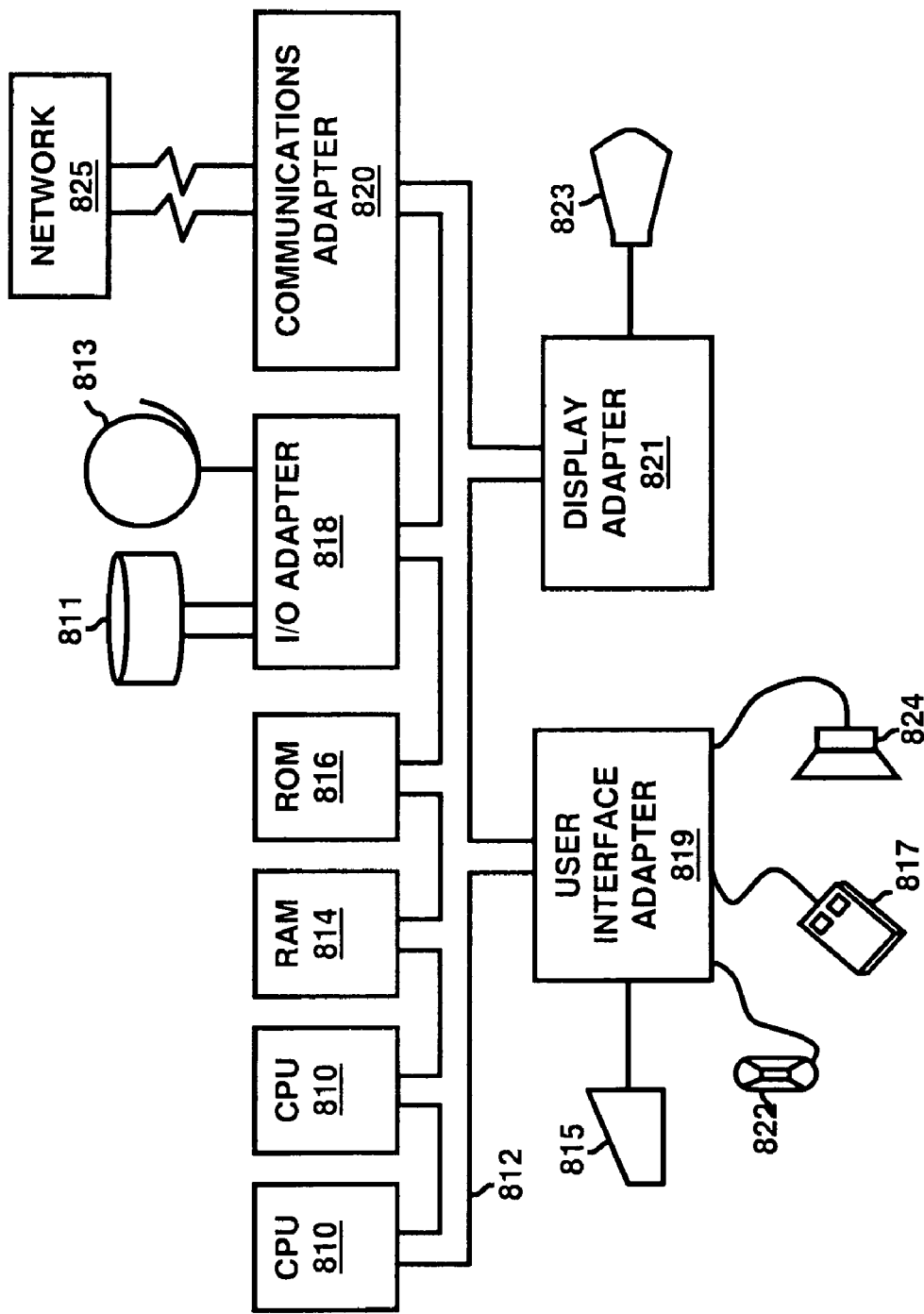
FIG. 8 illustrates a schematic diagram of a computer architecture used in accordance with the embodiments herein.

A representative hardware environment for practicing the embodiments herein is depicted in FIG. 8. This schematic drawing illustrates a hardware configuration of an information handling/computer system in accordance with the embodiments herein. The system comprises at least one processor or central processing unit (CPU) 810. The CPUs 810 are interconnected via system bus 812 to various devices such as a random access memory (RAM) 814, read-only memory (ROM) 816, and an input/output (I/O) adapter 818. The I/O adapter 818 can connect to peripheral devices, such as disk units 811 and tape drives 813, or other program storage devices that are readable by the system. The system can read the inventive instructions on the program storage devices and follow these instructions to execute the methodology of the embodiments herein. The system further includes a user interface adapter 819 that connects a keyboard 815, mouse 817, speaker 824, microphone 822, and/or other user interface devices such as a touch screen device (not shown) to the bus 812 to gather user input. Additionally, a communication adapter 820 connects the bus 812 to a data processing network 825, and a display adapter 821 connects the bus 812 to a display device 823 which may be embodied as an output device such as a monitor, printer, or transmitter, for example.

The embodiments herein provide the following: enhanced throughput of deframing process in MediaFLO™ devices; and reduced amount of data needed to store/process erasure indicators of MAC layer packet.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for finding errors in the fragment headers of the fragments of service layer packets without depending on the erasure indicators of Medium Access Channel (MAC) layer packets, said method comprising:
   determining, using a computer processor, if a length of said fragment header is less than 127 and greater than 121;
   determining, using said computer processor, if said length of said fragment header is equal to 127, and if said fragment header is not a last fragment header in a service layer packet being formed;
   determining, using said computer processor, if a summation of said length of said fragment header for a value N is greater than 122 subtracted by N, wherein N is the number of fragments collected from a MAC layer packet including said fragment header; and
   determining, using said computer processor, if said fragment header is not the last fragment header in said service layer packet being formed, and if said length of said fragment header is less than a residual number of bytes in said MAC layer packet.

2. The method of claim 1, further comprising deframing said MAC layer packet by reading data units in fragments of said MAC layer packet.

3. The method of claim 2, wherein deframing of said MAC layer packet is conducted by deframing a sublayer of a transport layer of said MAC layer packet to form said service layer packets.

4. The method of claim 1, wherein said MAC layer packet comprises a block of 122 bytes.

5. The method of claim 1, further comprising determining errors in fragment headers of said MAC layer packet without respective help by depending on a value of an erasure indicator associated with each said MAC layer packet.

6. The method of claim 5, wherein said detecting errors in said fragment header without depending on a value of an erasure indicator further comprises:
   determining a current fragment length;
   determining a residual number of bytes in a current MAC layer packet;
   determining the number of fragments in said current MAC layer packet; and
   determining if a current fragment header is the last fragment of said service layer packet.

7. The method of claim 6, wherein said current fragment header is set invalid if any of:
- said current fragment is not a last fragment of said service layer packet of length smaller than said residual number of bytes in said current MAC layer packet;
- a current fragment length is equal to 127 and is not the last fragment of said service layer packet;
- a value of a current fragment length is smaller than 127 and greater than 121; or
- a value of said summation of collected fragments length in said current MAC layer packet is greater than a difference of 122 and number of fragments collected from said current MAC layer packet.

8. The method of claim 1, further comprising applying a deframing algorithm to fragments of said MAC layer packet by:
- concatenating fragments of a current service layer packet;
- raising an error flag for a currently concatenated service layer packet;
- jumping to a first byte in said fragment header in a next MAC layer packet;
- concatenating said fragments to a current service layer packet until a last fragment of a current packet;
- discarding a current service layer packet; and
- continuing deframing of remaining packets.

9. A non-transitory computer readable medium readable by computer, tangibly embodying a program of instructions executable by said computer to perform a method for finding errors in the fragment headers of the fragments of service layer packets without depending on the erasure indicators of Medium Access Channel (MAC) layer packets, said method comprising:
- determining if a length of said fragment header is less than 127 and greater than 121;
- determining if said length of said fragment header is equal to 127, and if said fragment header is not a last fragment header in a service layer packet being formed;
- determining if a summation of said length of said fragment header for a value N is greater than 122 subtracted by N, wherein N is the number of fragments collected from a MAC layer packet including said fragment header; and
- determining if said fragment header is not the last fragment header in said service layer packet being formed, and if said length of said fragment header is less than a residual number of bytes in said MAC layer packet.

10. The program storage device of claim 9, further comprising deframing said MAC layer packet by reading data units in fragments of said MAC layer packet.

11. The program storage device of claim 10, wherein deframing of said MAC layer packet is conducted by deframing a sublayer of a transport layer of said MAC layer packet to form said service layer packets.

12. The program storage device of claim 9, wherein said MAC layer packet comprises a block of 122 bytes.

13. The program storage device of claim 9, further comprising determining errors in fragment headers of said MAC layer packet without help by depending on a value of an erasure indicator associated with each said MAC layer packet.

14. The program storage device of claim 13, wherein said detecting errors in said fragment header without depending on a value of an erasure indicator further comprises:
- determining a current fragment length;
- determining a residual number of bytes in a current MAC layer packet;
- determining the number of fragments in said current MAC layer packet; and
- determining if a current fragment header is the last fragment of said current service layer packet.

15. The program storage device of claim 14, wherein said current fragment header is set invalid if any of:
- said current fragment is not a last fragment of said service layer packet of length smaller than said residual number of bytes in said current MAC layer packet;
- a current fragment length is equal to 127 and is not the last fragment of said service layer packet;
- a value of a current fragment length is smaller than 127 and greater than 121; or
- a value of said summation of all collected fragments length in said current MAC layer packet is greater than a difference of 122 and number of fragments collected from said current MAC layer packet.

16. The program storage device of claim 9, further comprising applying a deframing algorithm to fragments of said MAC layer packet by:
- concatenating fragments of a current service layer packet;
- raising an error flag for a currently concatenated service layer packet;
- jumping to a first byte in said fragment header in a next MAC layer packet;
- concatenating said fragments to a current service layer packet until a last fragment of a current packet;
- discarding a current service layer packet; and
- continuing deframing of remaining packets.

17. A system for finding errors in the fragment headers of the fragments of service layer packets without depending on the erasure indicators of Medium Access Channel (MAC) layer packets, said system comprising:
- a computer processor for determining:
  - if a length of said fragment header is less than 127 and greater than 121;
  - if said length of said fragment header is equal to 127, and if said fragment header is not a last fragment header in a service layer packet being formed;
  - if a summation of said length of said fragment header for a value N is greater than 122 subtracted by N, wherein N is the number of fragments collected from a MAC layer packet including said fragment header; and
  - if said fragment header is not the last fragment header in said service layer packet being formed, and if said length of said fragment header is less than a residual number of bytes in said MAC layer packet.

18. The system of claim 17, further comprising means for deframing said MAC layer packet by reading data units in fragments of said MAC layer packet, wherein deframing of said MAC layer packet is conducted by deframing a sublayer of a transport layer of said MAC layer packet to form said service layer packets.

19. The system of claim 17, wherein said MAC layer packet comprises a block of 122 bytes.

20. The system of claim 17, further comprising means for determining errors in fragment headers of said MAC layer packet without help by depending on a value of an erasure indicator associated with each said MAC layer packet, wherein said detecting errors in said fragment header without depending on a value of an erasure indicator further comprises:
- determining a current fragment length;
- determining a residual number of bytes in a current MAC layer packet;
- determining the number of fragments in said current MAC layer packet; and
- determining if a current fragment header is the last fragment of said current service layer packet.

* * * * *